RECORDER

Filed Nov. 4, 1963

7 Sheets-Sheet 1

INVENTOR.
RICHARD S. KAMPF

BY Arthur H. Swanson

ATTORNEY.

INVENTOR.
RICHARD S. KAMPF
BY Arthur H. Swanson
ATTORNEY.

Aug. 30, 1966 R. S. KAMPF 3,269,262

RECORDER

Filed Nov. 4, 1963 7 Sheets-Sheet 3

INVENTOR.
RICHARD S. KAMPF

BY Arthur H. Swanson

ATTORNEY.

Aug. 30, 1966 R. S. KAMPF 3,269,262

RECORDER

Filed Nov. 4, 1963 7 Sheets-Sheet 4

INVENTOR.
RICHARD S. KAMPF
BY Arthur N. Swanson
ATTORNEY.

INVENTOR.
RICHARD S. KAMPF
BY Arthur H. Swanson
ATTORNEY.

Aug. 30, 1966 R. S. KAMPF 3,269,262

RECORDER

Filed Nov. 4, 1963 7 Sheets-Sheet 6

INVENTOR.
RICHARD S. KAMPF

BY Arthur H. Swanson

ATTORNEY.

Aug. 30, 1966 R. S. KAMPF 3,269,262

RECORDER

Filed Nov. 4, 1963 7 Sheets-Sheet 7

INVENTOR.
RICHARD S. KAMPF

BY Arthur H. Swanson

ATTORNEY.

United States Patent Office 3,269,262
Patented August 30, 1966

3,269,262
RECORDER

Richard S. Kampf, Denver, Colo., assignor to Honeywell Inc., a corporation of Delaware Filed Nov. 4, 1963, Ser. No. 321,264
4 Claims. (Cl. 88—24)

Recorders in use at the present time, particularly oscillographic recorders, operate at such high speeds that they consume great quantities of recording paper and accumulate large amounts of data. Much of this data simply shows that the variable which is being measured is operating within its normal limits of operation. Especially when the recorder is being used to record the results of tests, data which is of particular interest is that which falls outside of the normal range of operation of the variable being measured.

Accordingly, it is an object of this invention to provide means for visually monitoring temporarily recorded analog signals from variables as they are made, giving a "quick look," and for permitting the permanent recording of those variables which are of especial interest.

In other words, it is an object of this invention to provide means which permit an observer readily to see the changes in the variables as they occur and to take corrective or other action with regard to them.

It is an additional object of this invention to provide means for observing or monitoring such data and to provide means for selectively recording this data by a camera or other recording means.

A more specific object of this invention is to provide means for the continuous, visual monitoring of the data so that the observer may take the corrective or other action if the data is of interest to him. Additionally, one camera may be provided for recording the data together with means for placing the camera in non-recording condition to permit viewing only of the data as it is being produced without recording the data or means for placing the camera in recording condition to make a record of the data.

More specifically, it is an object of this invention to provide means for viewing analog data as it is being supplied by a device, such as an oscillograph employing galvanometers having mirrors. These means include a continuous belt sensitized to the radiant energy applied to the galvanometer mirrors which mirrors oscillate or deflect in response to the data to be recorded. Traces are produced on this belt which traces, when visually observed at the same time as the data is being measured, indicate whether the data being received by the oscillograph is of sufficient interest to be permanently recorded or not.

A yet more specific object of this invention is to provide an endless belt which is long enough so that the data temporarily recorded on the belt decays or erases itself before the belt repeats its travel through any particular point in its path of travel.

Still another object of this invention is to provide a permanent recording means employing a camera either of the Polaroid-Land type or of the micro-film type. By the use of such a micro-film camera, a minification ratio may be employed of approximately 7.6 to 1 for 35 millimeter film and approximately 15 to 1 for 16 millimeter film.

An additional object of this invention is to provide a camera film speed which makes possible a trace resolution far higher than those heretofore provided by an ordinary oscillograph.

A better understanding of the present invention may be had from the following detailed description when read in connection with the accompanying drawings, in which.

The device of this invention represents an improvement over the devices disclosed in United States Patent 2,580,427 to C. A. Heiland and United States Patent 3,066,299 to R. S. Kampf. Reference is made to these two patents for a disclosure of a recording oscillograph to which the invention of this application is applied.

Figure 1:
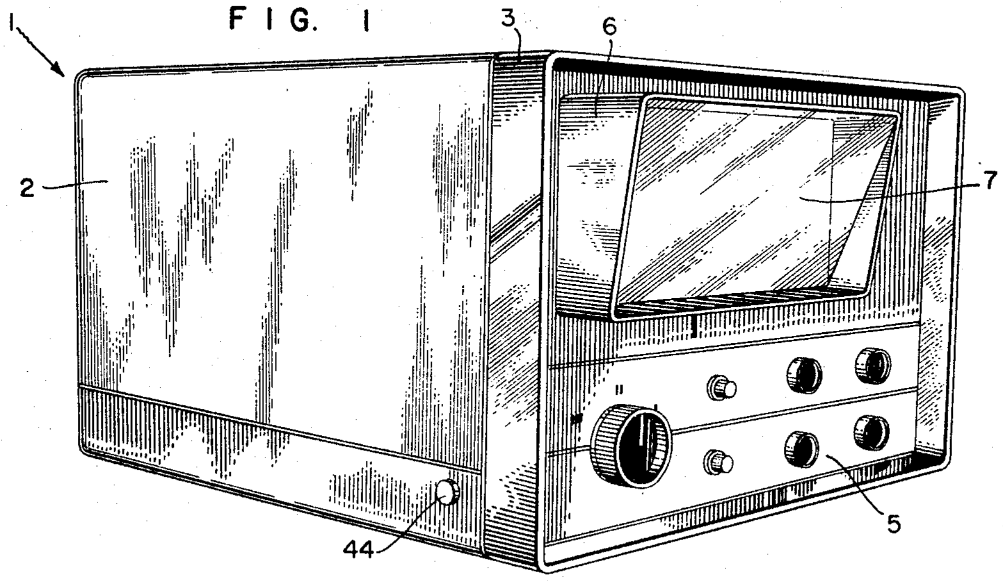
FIG. 1 is a perspective view showing the front and left hand side of the device.

FIG. 1 shows an oscillographic recorder having a case, generally indicated 1, formed of a wall 2 having an opening in the front in which is mounted a frame 3 having an aperture therethrough. A light shield or hood 6 is mounted in the aperture in frame 3 and projects forward therefrom. In the light shield or hood 6 is mounted a window pane 7 of plastic or the like which is transparent and which is located at an angle to the vertical.

Figure 2:
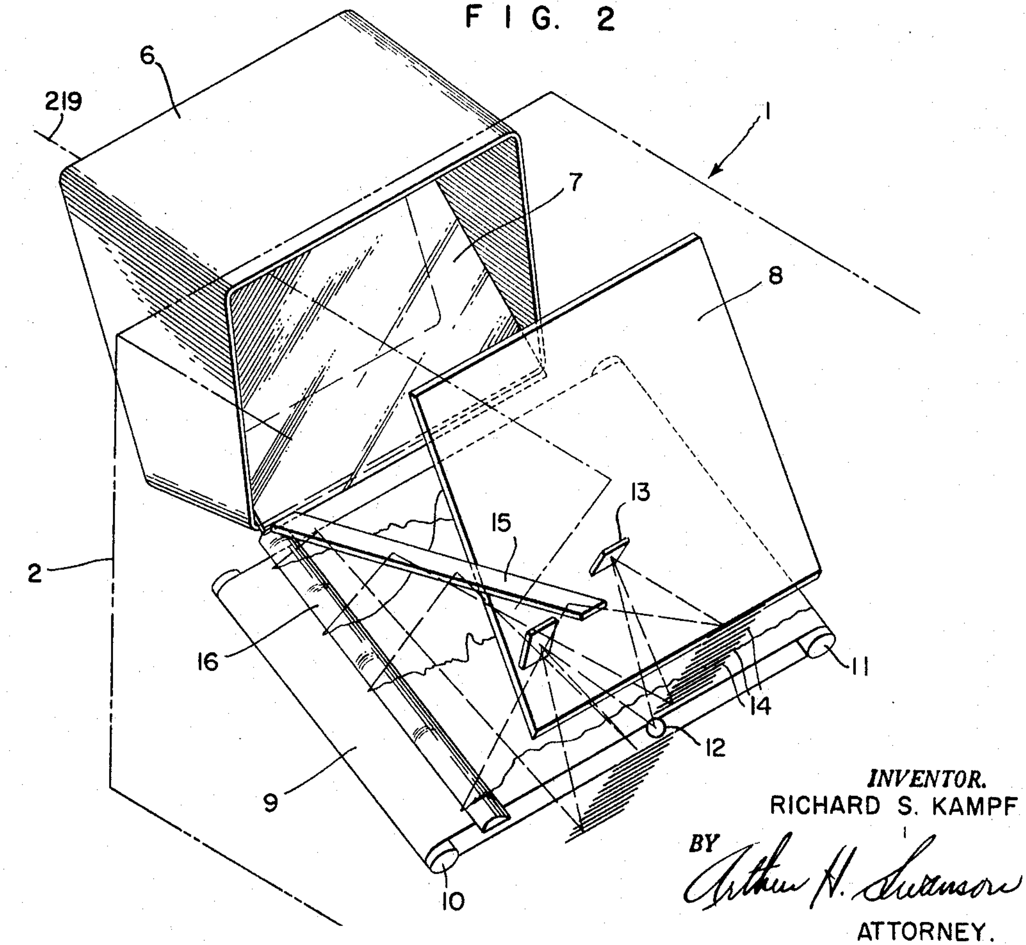
FIG. 2 is a diagrammatic or schematic, perspective view looking from the rear of the device showing that modification of the device which does not employ a camera.
Figure 3:
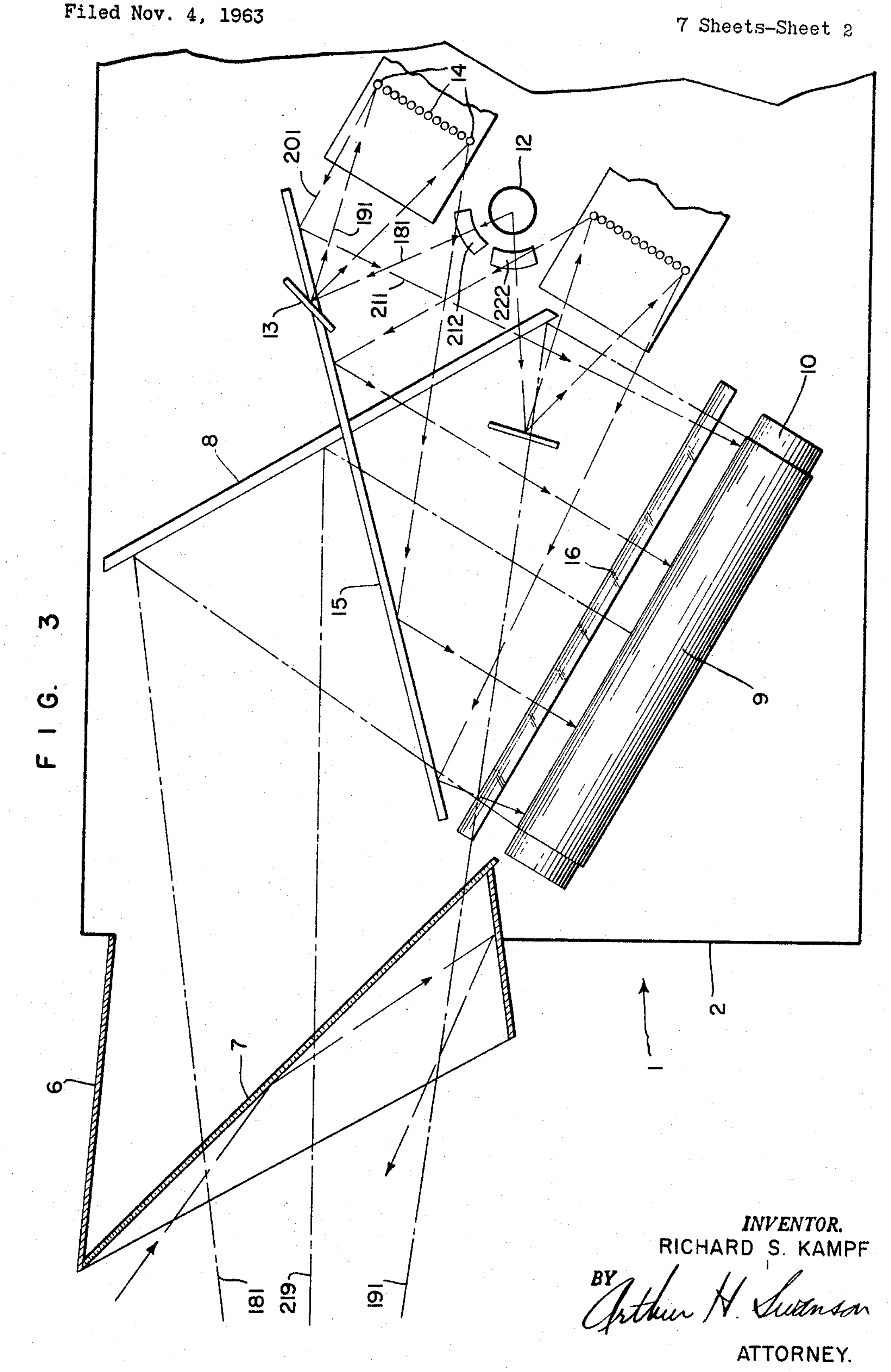
FIG. 3 is a diagrammatic or schematic view, generally in vertical, longitudinal, cross section, showing that modification of the device which does not employ a camera and which is shown in FIG. 2.

FIGS. 2 and 3 show the optical system of the recorder. This system comprises a source 12 of radiant energy. One suitable such source is a two-element, mercury-vapor, electric lamp enclosed in a quartz envelope and adapted to emit a beam of high intensity. An example of such a lamp is that manufactured by the Osram Company in West Germany and identified as their model HBO–109. This lamp has an arc 0.012 inch in diameter.

Radiant energy from source 12 passes through two collector lenses 212 and 222 which focus the radiant energy from the source 12 onto the galvanometer mirrors as is explained hereinafter.

Radiant energy from source 12, which has passed through lenses 212 or 222, is reflected by one or more first mirrors 13 to each of the galvanometer mirrors 14. Collector lenses 212 and 222 focus this radiant energy on these galvanometer mirrors. A plurality of galvanometers are employed in the device of this invention. These galvanometers are arranged in groups known as banks. These galvanometer mirrors 14 may have concave surfaces and are mounted to oscillate with the movable elements of a series of galvanometers. These galvanometer mirrors are arranged side-by-side in the banks and each one is connected by a cable capable of conducting electricity with a source of electrical oscillation to be studied by the use of the recorder. The mirrors 14 of the galvanometers oscillate about vertical axes in response to the oscillations in response to the source to which they are connected. A beam of radiant energy (represented by a dashed line 181) is reflected from the source 12 to first mirrors 13. A beam 191 is reflected by the first mirrors 13 to the galvanometer mirrors 14. A beam 201 passes from the galvanometer mirrors 14 to second mirrors 15 whence a beam 211 passes to the surface of an endless belt 9. Belt 9 is sensitized to the wave lengths contained in the radiant energy from the source 12 as by incorporating a phosphor in the exposed surface of the belt 9. The belt 9 is endless and travels over a drive roller 10 and one or more idler rollers 11 through a path of sufficient length so that, before any particular point on the belt can pass a second time through the same particular point in its path of travel, the trace or image recorded on the belt 9 has decayed or erased itself so that it is no longer visible.

The beams 211 are concentrated by a first recording lens 16 on a portion of the belt 9 so as to produce a visible spot on the surface of the belt 9. These spots are called galvo-spots hereinafter. These galvo-spots produce a visible image or trace on the surface of the belt 9. The belt 9 is employed to make a temporary record of the data being received by the recorder. The images or traces on the surface of the belt 9 are carried by the movement of the belt to the right, as seen in FIG. 2, to a location where they are visible by means of viewing mirror 8 to the operator or person 31 inspecting them as indicated by the lines 181, 191 and 219 consisting of single dashes and dots.

The observer 31 can readily see any changes in the variables as they occur and take corrective or other action with regard to them.

Figure 4:
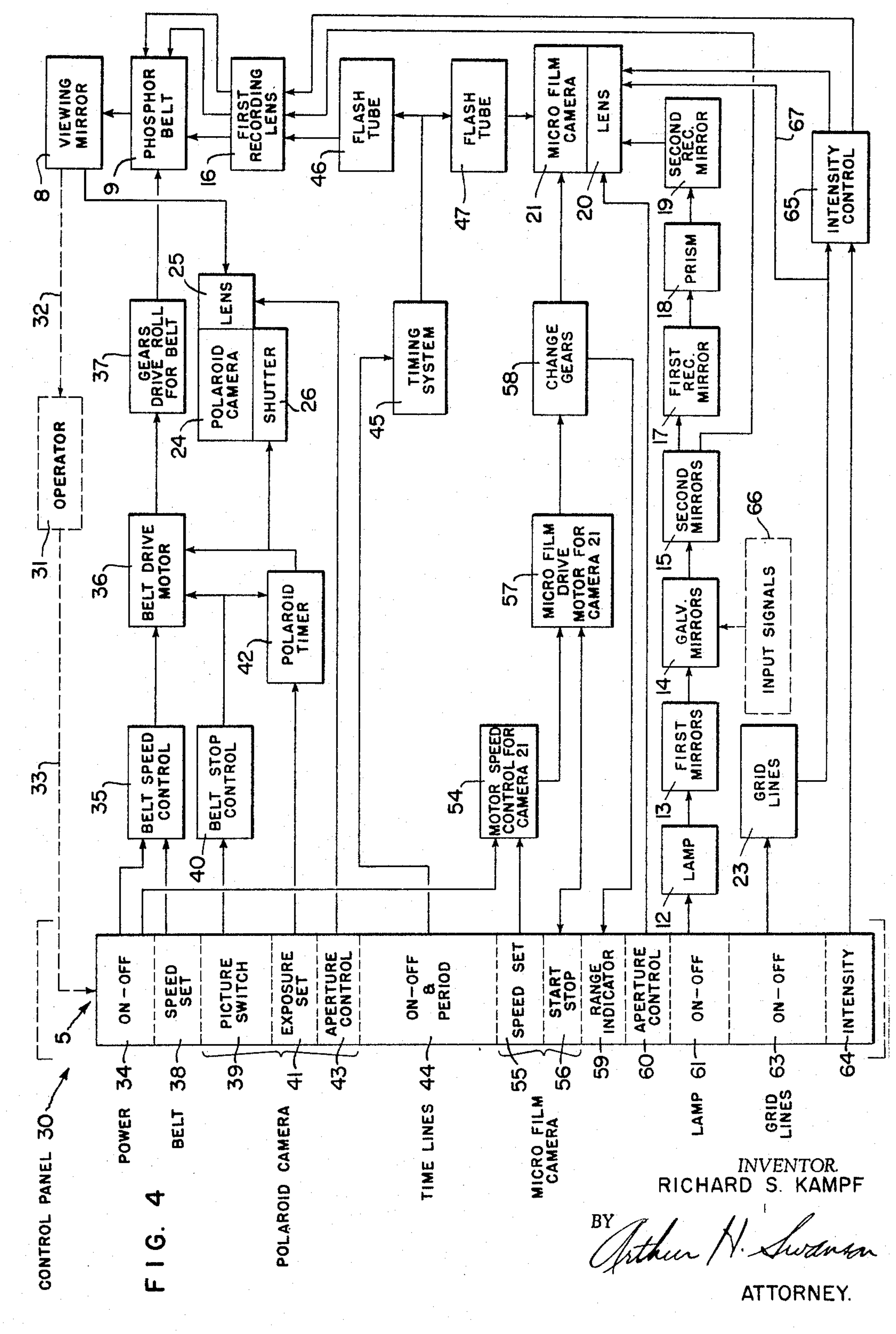
FIG. 4 is a block diagram showing both modifications of the invention which include a camera.

FIG. 4 is a block diagram of the two modifications of this invention which employ a camera. Block 31 designates the operator of the device who, by looking along the line 32 to viewing mirror 8, can see the traces or records temporarily recorded on the phosphor belt 9. The operator 31 may reach out manually, as indicated by line 33, to operate any of the operating knobs or handles 5 on the control panel 30.

An electric switch 34 is connected between a source of power (not shown) and belt speed control 35 so as to turn control 35 on or off. Control 35 governs the speed at which belt drive motor 36 drives gears 37 and drive roll 10, which is connected so as to drive endless belt 9 on which signals are temporarily recorded.

A handle 38 sets the speed at which control 35 drives motor 36.

A picture switch 39, which may conveniently be a push-button electric switch, controls the supply of power to belt stop control 40 which is connected so as to stop motor control 36 and to start Polaroid exposure timer 42 for Polaroid camera 24.

Handle 41 may be manually operated to set the exposure time by means of the Polaroid timer 42. Timer 42 is connected to open and close shutter 26 for the preset exposure time and to start motor 36 after camera film exposure. Camera 24 has a shutter 26. A handle 43 is manually operable to set the aperture or *f*-stop of the lens 25 of camera 24.

Camera 24 is of the Polaroid-Land type and is disclosed in one or more of the following United States patents:

Patents Nos. 2,435,717; 2,435,718; 2,435,720; 2,455,111; D. 152,229; 2,483,014; 2,491,719; 2,491,769; 2,495,111; 2,500,421; 2,504,312; 2,510,306; 2,516,398; 2,531,936; 2,538,511; 2,543,159; 2,543,160; 2,544,890; 2,590,186; 2,630,050; 2,647,056; 2,662,457; D. 175,571; 2,740,338; 2,740,340; 2,740,341; 2,740,342; 2,740,343; 2,752,834; 2,794,378; 2,804,812; 2,835,177; 2,843,029; 2,854,908; 2,869,444; 2,877,697; 2,877,699; 2,903,950; 2,935,004; 2,966,102; 2,995,071; 2,995,073; and 3,015,982.

Handle 44 is manually operable to connect the power to or disconnect the power from timing system 45 of timer flash-tube 46 which applies time-lines to belt or film 9. The output of the timing system 45 is timing pulses which are fed to flash-tube 46 and to flash-tube 47. Flash-tube 46 supplies time-lines to camera 21. Timing system 45 determines intervals between flashes.

Handle 55 is manually operable to set the speed of a control 54 which governs the speed at which the motor 57 drives camera 21 which is of the microfilm type. Control 54 is also under the control of switch 34 which governs the application of power to the control 54. A manually operable switch 56 governs the supply of power to the motor 57 which drives micro-film camera 21. Motor 57 drives camera 21 through change speed gears 58. Gears 58 set a range indicator 59 on the control panel 30 and also operate camera 21 so as to control the speed at which the film of the camera is driven.

A handle 60 controls the aperture or *f*-stop of the lens 20 of the camera 21.

A manually operable switch 61 governs the application of power to a source 12 of radiant energy, such as an Osram lamp, which emits radiant energy containing wave lengths to which the belt 9 is sensitized as by incorporating a phosphor in the exposed surface of the belt 9. The radiant energy from the source 12 passes to first mirrors 13 and thence to the galvanometer mirrors 14 which are located in groups known as banks. The galvanometer mirrors 14 are mounted so as to be angularly deflected about an axis by means of variable electric signals 66 which form the input which is desired to monitor or record. This rotation of the galvanometer mirrors 14 causes a beam of radiant energy reflected from each of the mirrors to be reflected by a second mirror 15 to a lens 16 (usually referred to as a first recording lens) which lens concentrates a portion of this radiant energy on a portion of the belt 9 so as to produce a visible spot on the surface of the belt 9.

A portion of the radiant energy from the galvanometer mirrors 14 and a second mirror 15 is reflected by first recording mirror 17 to prism 18 which has a ground surface and an aperture along its top. Second recording mirror 19 directs this portion of the radiant energy to a third recording mirror 291 (FIG. 7) and thence to lens 20 of a continuous motion, streak-type, 35-millimeter, micro-film camera 21. Camera 21 photographs the galvo-spots which show at the top of prism 18. The grid-line aperture strip, which appears at the top of grid-line tube 23, can be photographed by camera 21 at the same time, as the grid-line appears to the camera to be adjacent the galvo-spot aperture.

As an alternative, the Polaroid-Land camera 24 can be focused on the belt 9 so as to photograph the trace or images appearing on the belt 9 by receiving radiant energy from the traces or images. The belt 9 must be stopped when the camera 24 is to be employed to photograph the trace or image. This is done by handle 41, as explained above.

In order to render the data being recorded more intelligible, means are provided for producing time lines along with the data being recorded. These means comprise a flash tube 46 which is intermittently fired at suitable time intervals by timing system 45. Flash tube 46 intermittently applies flashes of light to the surface of belt 9 through the final lens which focuses the light into a transverse line across the belt to form transverse time lines across the belt.

Continuous grid lines, which are longitudinal lines, can be applied to the belt 9 or to the camera 21 by the emission of radiant energy from a tubular, fluorescent lamp 23 which emits ultra-violet light when connected to a source of energy (not shown) by means of an electric switch 63 on control panel 30. Light or radiant energy from lamp 23 passes through an intensity control 65 which can be manually adjusted by means of handle 64 on control panel 30 so as to vary the intensity of the light or radiant eenrgy which passes from lamp 23 to camera 21 or to belt 9, respectively. Light or radiant energy can pass directly from lamp 23 to camera 21 as indicated by line 67.

Figure 5:
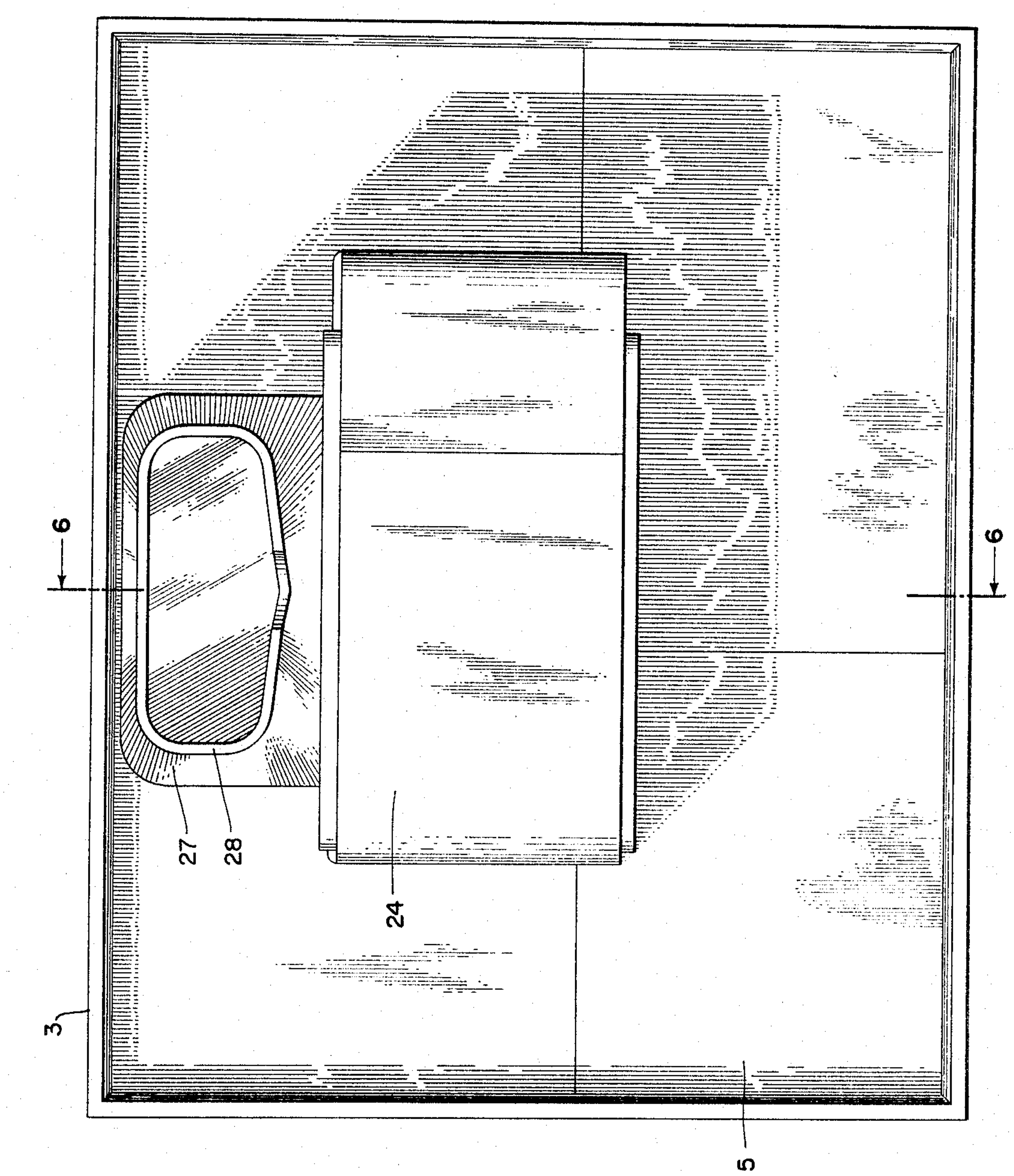
FIG. 5 is a front elevation of that modification of the device which employs a Polaroid-Land camera.
Figure 6:
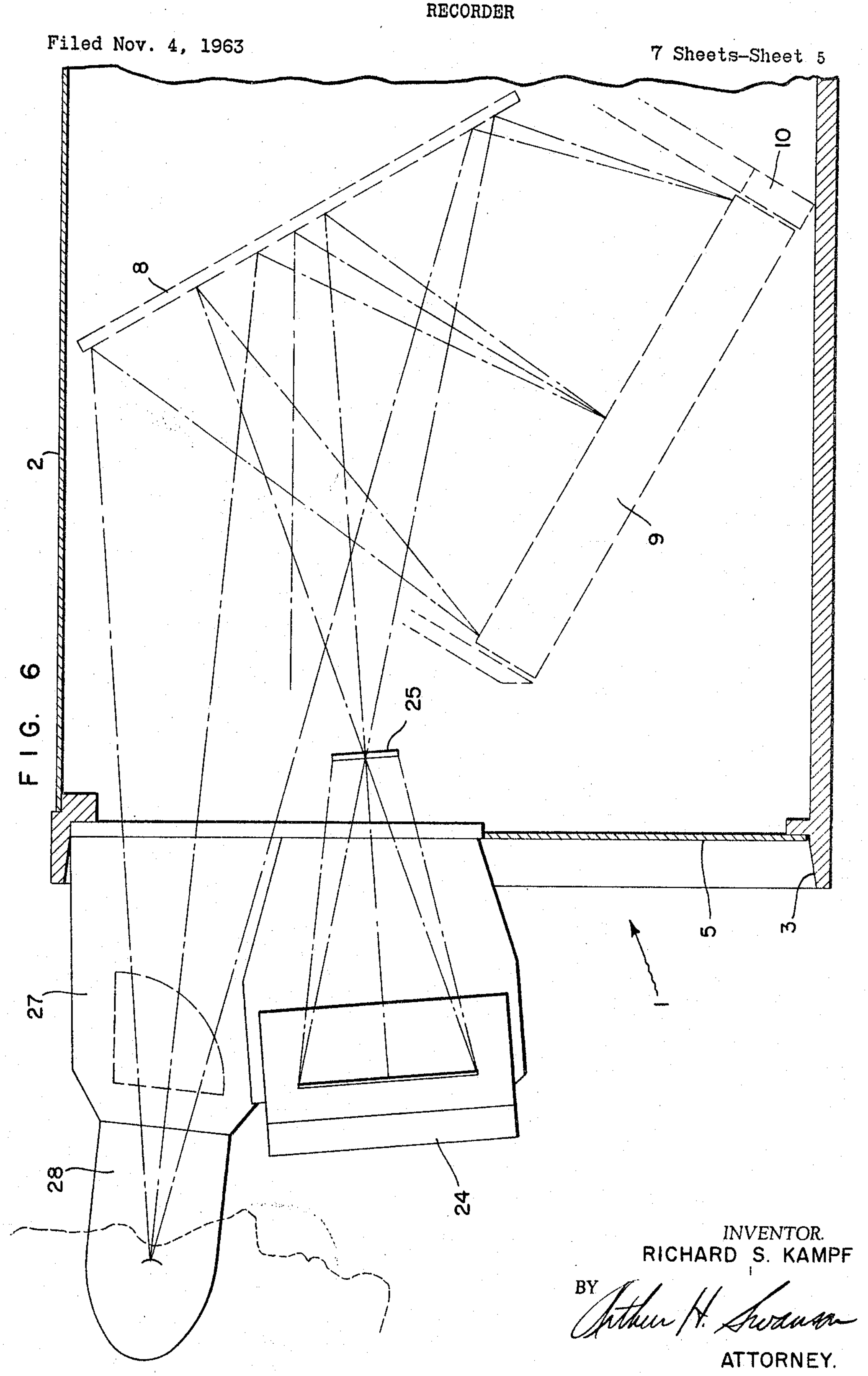
FIG. 6 is a diagrammatic or schematic view generally in vertical, longitudinal, cross section on line 6—6 of FIG. 5 as viewed in the direction of the arrows.

FIGS. 5 and 6 show an embodiment of this invention which employs a Polaroid-Land camera and which comprises a case 1 having a wall 2 having an aperture therein which is mounted on a frame 3 having an aperture through it. In the aperture in frame 3 is mounted a viewing hood or light-excluding shield 27 having its left end formed so as to fit about the eyes of an observer and thereby to exclude extraneous light from the eyes of the observer.

Within the case 1 is located an endless belt 9 having a phosphor on its surface. A drive roll 10 causes movement of the endless belt 9. Viewing mirror 8 reflects the light from the upper surface of the belt 9 to the aperture 28 in the viewing hood 27. In the front wall of the case 1 is mounted a camera 24 of the Polaroid-Land type having the lens 25 by means of which light reflected from the surface of the endless belt 9 is focused on the film in the Polaroid-Land camera 24. Whenever the operator 31 so desires he can actuate the picture switch 39 manually and thereby shut off the supply of power to the belt stop control 40 which is connected so as to stop motor control 36 and to start the timer 42 which controls the Polaroid-Land camera 24. Timer 42 starts motor 36 after the film has been photographed by the camera 24.

Figure 7:
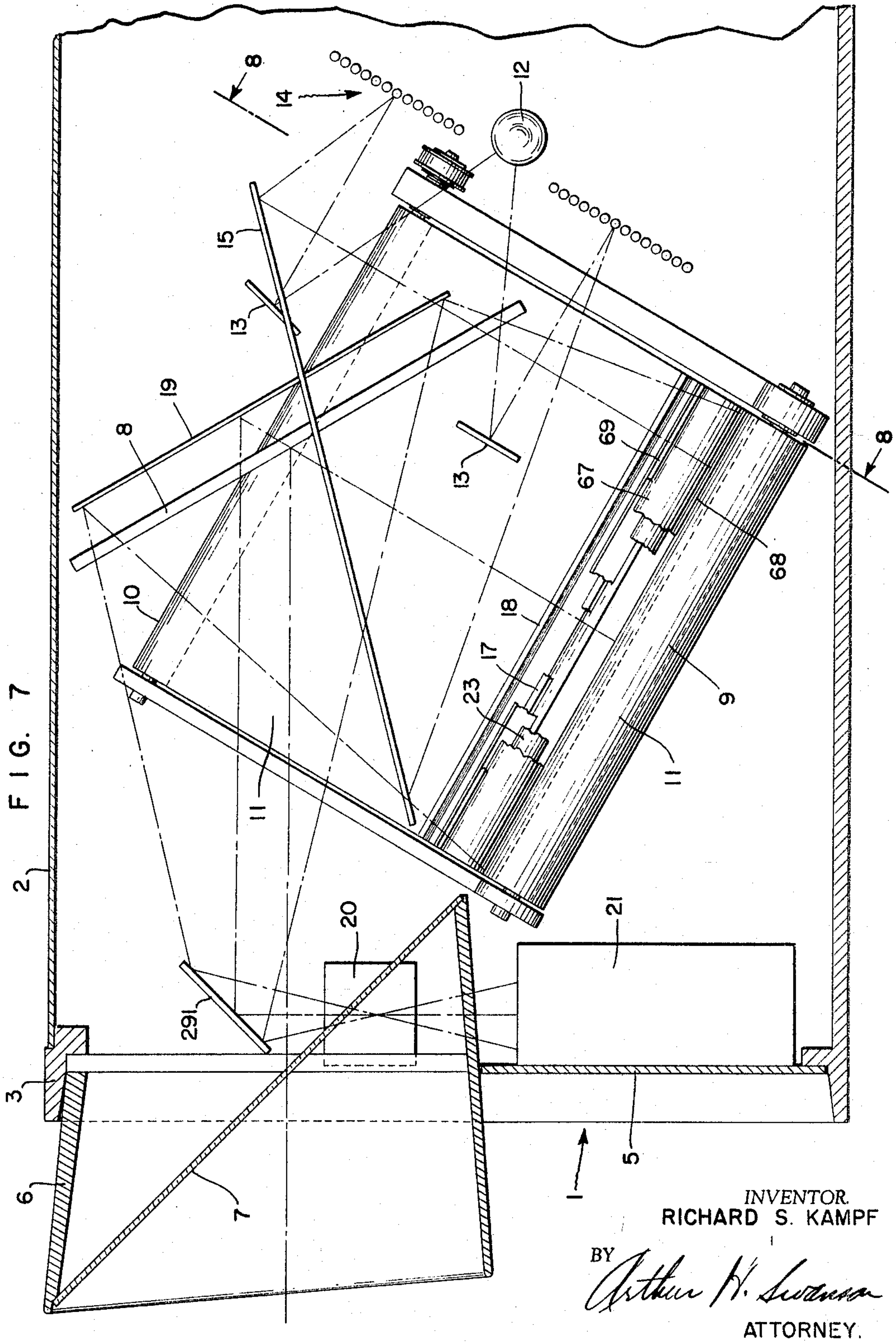
FIG. 7 is a diagrammatic or schematic view generally in vertical, longitudinal, cross section of that modification of the device employing a micro-film camera.
Figure 8:
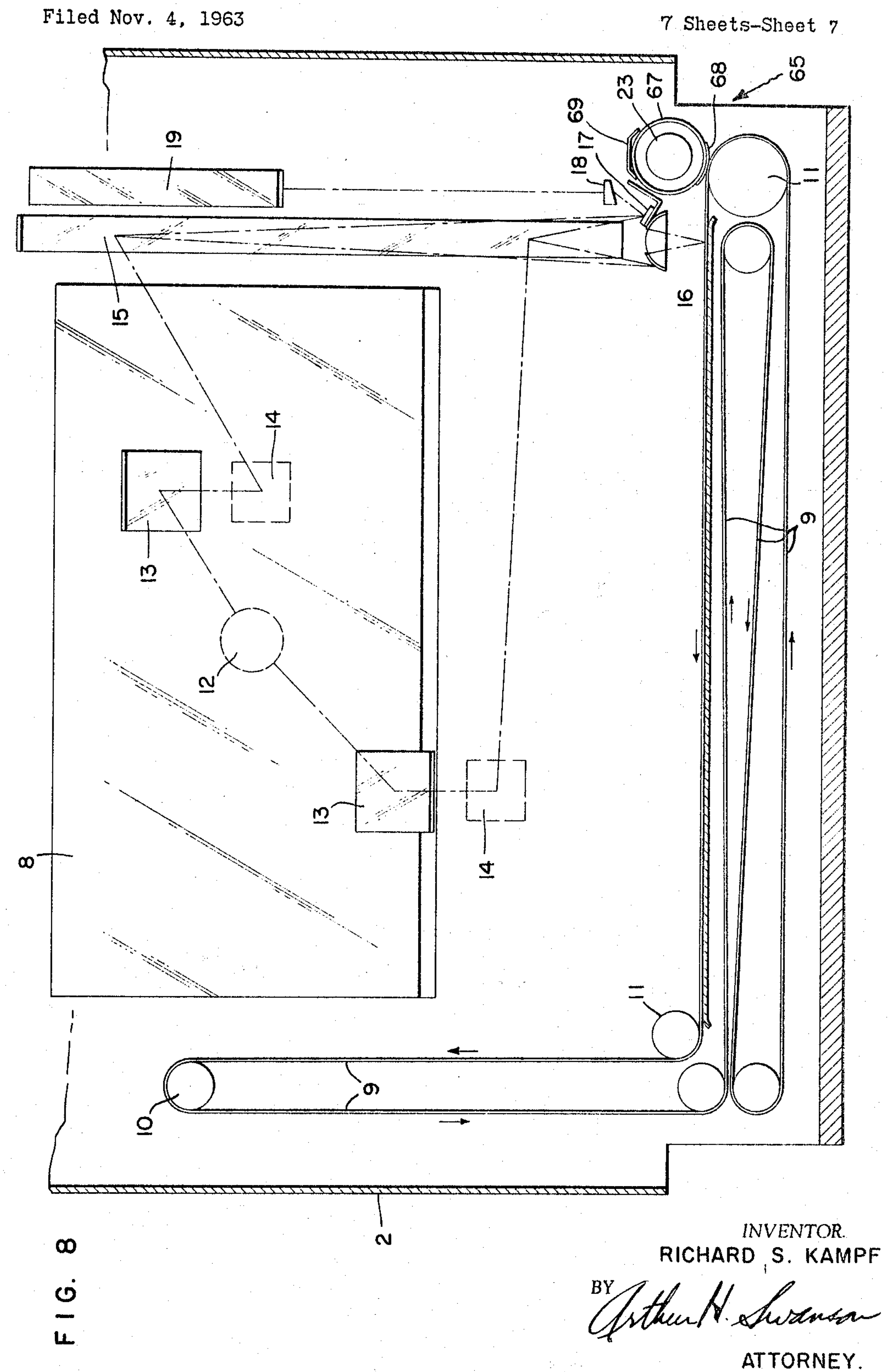
FIG. 8 is a diagrammatic or schematic view generally in transverse, vertical, cross section on line 8—8 of FIG. 7 as viewed in the direction of the arrows.

FIGS. 7 and 8 show that modification of the applicant's invention which employs a micro-film camera. This embodiment of the invention comprises a case 1 having a wall 2 and a frame 3 having an aperture therethrough. A light shield or hood 6 is mounted in the aperture in frame 3 and contains a transparent window pane 7 of plastic or the like.

Within case 1 is mounted an endless belt 9 having its surface treated with a phosphor which is especially responsive to radiant energy emitted by the source 12. Belt 9 is driven by drive roll 10 and plurality of idler rolls 11.

Radiant energy from source 12 is reflected by first mirrors 13 to galvanometer mirrors 14 whence it is reflected by second mirrors 15 to the first recording lens 16 which concentrates a portion of this radiant energy on a portion of the belt 9 so as to produce a visible spot on the surface of the belt 9. Movement of the belt 9 causes these spots to form an image or trace recording the movements of the variable connected to the particular galvanometer mirror.

FIG. 8 also shows the means for applying grid lines to the belt 9. These means comprise tubular, fluorescent, electric lamp 23 adapted to emit ultra-violet light when connected to a source of electricity (not shown) by electric switch 63, (FIG. 4). The radiant energy from lamp 23 passes through an intensity control, generally indicated 65, which is adjustable by means of a handle 64 from the control panel 30 (FIG. 4). Intensity control 65 comprises an intensity control tube 67 surrounding the lamp 23 and having apertures in its surface. The apertures in tube 67 mate with apertures in intensity control strips 68 and 69 which are located between lamp 23 and belt 9 and between lamp 23 and camera 21, respectively. Tube 67 is simply a mechanical shutter adjusted by handle 64 (FIG. 4) which effectively reduces the length of the slots of apertures in the strips 68 and 69 whence the radiant energy from lamp 23 is transmitted to the surface of belt 9 or to camera 21, respectively.

What is claimed is:

1. Means for monitoring the data being measured by an oscillograph, including, a light-sensitive phosphor coated belt, means for driving said belt at a uniform speed, means for making a visible indication on said belt, a case housing said belt and said two above-mentioned means and having an aperture therethrough, a hood surrounding said aperture and extending from said belt so as to exclude direct rays of ambient light from said belt, a window pane extending across said aperture and reflecting some of the ambient light passing into said aperture, and a viewing mirror in said housing between said aperture and said belt and affording a view of the indication on said belt through said aperture.

2. In an oscillograph, means for viewing the indication made by said oscillograph under conditions of high ambient light, including, a phosphor belt containing a substance especially responsive to a selective band of wave-lengths of radiant energy, means for driving said belt at a selected uniform speed, a source of radiant energy containing said selective band of wave-lengths, means for deflecting said radiant energy from said source across the surface of said belt so as to make an indication thereon, a case housing the above-mentioned elements and having an aperture through the wall thereof, a hood surrounding said aperture and projecting from said case so as to exclude a portion of the ambient light from passing through said aperture, a window pane located in said aperture and reflecting some of the ambient light tending to pass through said aperture, and a viewing mirror mounted in said case between said aperture and said belt and affording a view of the indication on said belt through said aperture.

3. In an oscillograph, means for viewing the indication made by said oscillograph under conditions of high ambient light, including, a belt having a phosphor substance responsive to a selected band of wave lengths of radiant energy, means for driving said belt at a uniform speed, an electric lamp forming a high intensity source of radiant energy including said selected band of wave lengths, a galvanometer including a galvanometer mirror for deflecting radiant energy from said source across said belt to make an indication on said belt, a case housing the above-mentioned elements and having a vertical wall having an aperture passing therethrough and located with relation to said belt so that light passing through said aperture cannot fall directly on said belt, a hood projecting from said case in a substantially horizontal direction and surrounding said aperture and projecting further at the top than at the bottom so as to exclude a certain amount of ambient light from passing through said aperture, a window pane of transparent material located in said hood at an angle to the vertical serving to reflect a certain amount of ambient light passing into said aperture, and a viewing mirror located in said case between said aperture and said belt so as to afford a view of the indication on said belt through said aperture.

4. In an oscillograph, means for visually continuously monitoring the indication made by said oscillograph, including, a belt having a phosphor substance responsive to a selected band of wave lengths of radiant energy, means for driving said belt at a uniform speed through a closed path, an electric lamp forming a high intensity source of radiant energy including said selected band of wave lengths, a galvanometer including a galvanometer mirror for deflecting radiant energy from said source across said belt to make an indication on said belt, a case housing the above-mentioned elements and having a vertical wall having an aperture passing therethrough and located adjacent to said belt so that light passing through said aperture cannot fall directly on said belt, a hood projecting from said case in a substantially horizontal direction and surrounding said aperture and projecting further at the top than at the bottom so as to exclude a certain amount of ambient light passing through said aperture, a window pane of transparent material located in said hood at an angle to the vertical serving to deflect a certain amount of ambient light passing into said aperture, and a viewing mirror located in said case between said aperture and said belt so as to afford a view of the indication on said belt through said aperture, said belt being of sufficient length so that the indication on said belt disappears before it passes a second time through any particular portion of the path of travel of said indication.

References Cited by the Examiner

UNITED STATES PATENTS

| | | | |
|---|---|---|---|
| 2,928,489 | 3/1960 | Perry | 346—109 X |
| 3,128,683 | 4/1964 | Rubin | 95—1.7 |
| 3,181,171 | 4/1965 | Erickson | 346—109 |

NORTON ANSHER, *Primary Examiner.*

R. A. WINTERCORN, *Assistant Examiner.*